United States Patent
Shen et al.

(10) Patent No.: US 7,252,312 B1
(45) Date of Patent: Aug. 7, 2007

(54) RADIATOR GRILL ATTACHMENT

(75) Inventors: Mingher Fred Shen, Ann Arbor, MI (US); Eric Yoshinari, San Diego, CA (US); Umesh Naik, Ann Arbor, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 0 days.

(21) Appl. No.: 11/345,592

(22) Filed: Feb. 1, 2006

(51) Int. Cl.
*B60R 19/52* (2006.01)
(52) U.S. Cl. .................................... 293/115; 293/193.1
(58) Field of Classification Search ................ 293/115, 293/193.1
See application file for complete search history.

(56) References Cited

U.S. PATENT DOCUMENTS

| | | | |
|---|---|---|---|
| 2,880,016 A * | 3/1959 | Peterson | 293/115 |
| 4,099,760 A * | 7/1978 | Mascotte et al. | 293/115 |
| 4,753,468 A * | 6/1988 | Szymczak et al. | 293/115 |
| 5,067,760 A * | 11/1991 | Moore et al. | 293/115 |
| 5,503,444 A * | 4/1996 | Rouse et al. | 293/115 |
| 5,636,885 A * | 6/1997 | Hummel | 293/115 |
| 6,447,032 B1 * | 9/2002 | Howell, Sr. | 293/115 |
| 6,659,220 B2 * | 12/2003 | Kobayashi | 293/155 |
| 7,044,517 B2 * | 5/2006 | Hyuga | 293/115 |
| 7,090,265 B2 * | 8/2006 | Otte | 293/115 |
| 2006/0157992 A1 * | 7/2006 | Sakamoto et al. | 293/115 |

FOREIGN PATENT DOCUMENTS

JP 04-015123 1/1992

* cited by examiner

*Primary Examiner*—Kiran B. Patel
(74) *Attorney, Agent, or Firm*—Gifford, Krass, Sprinkle, Anderson & Citkowski, P.C.

(57) ABSTRACT

A side attachment for attaching a grill to a front bumper of a vehicle allows the grill to pivot independently relative to the front bumper. The grill also includes tabs that locate the bottom edge of the grill to the front bumper and release the grill to allow rotation during a frontal impact of the vehicle, thereby minimizing damage to the grill.

8 Claims, 2 Drawing Sheets

RADIATOR GRILL ATTACHMENT

BACKGROUND OF THE INVENTION

1. Field of the Invention

The invention relates to radiator grills for automotive vehicles. More specifically, the invention relates to a side attachment arrangement for connecting a radiator grill to a bumper facia.

2. Description of the Related Art

The Insurance Institute for Highway Safety (IIHS) presently conducts among other tests a low-speed bumper test on new vehicle models in order to assess performance and repair costs associated with damage resulting from the test. In this test, the vehicle is crashed four separate times at 5 mph—both front and rear bumpers into a flat barrier, the front bumper into an angle barrier and the rear bumper into a short pole. Ratings are then given on the usual "Good" to "Poor" scale based on repair costs.

Most vehicles today, especially passenger cars, utilize wrap-around style front bumpers and center radiator grills that are made of resin. Typically, the bumper and grill are each fixedly secured to the vehicle body or chassis using bolts, screws, push fasteners and the like. Resins have become the materials of choice for such applications, due to the relative light weight and design flexibility over comparable metal equivalents. Plastic bumpers and grills are, however, particularly susceptible to damage during frontal impacts, including low speed impact events similar to those encountered in the IIHS testing. During a low speed frontal impact event, such as the IIHS flat barrier test, it has been repeatedly observed in a variety of vehicles that the front bumper and grill are displaced relative to the vehicle chassis and damaged as a result. Often the bumper and/or grill are damaged to such an extent that they must be replaced. Replacement costs for these parts are relatively high and are often the root cause of "poor" IIHS performance ratings.

Thus, it remains desirable to provide a plastic bumper and grill design that is less susceptible to damage during low-speed frontal impacts, such as those encountered in IIHS testing.

SUMMARY OF THE INVENTION

According to one aspect of the invention, a side attachment is provided for attaching a grill to a front bumper of a vehicle that allows the grill to pivot independently relative to the front bumper during a frontal impact of the vehicle, thereby minimizing damage to the grill and associated repair costs. More specifically, the front bumper extends along a front end of the vehicle. The grill is pivotally coupled to the front bumper for rotation about a substantially horizontal pivot axis relative to the front bumper. The grill has a bottom end releasably coupled to the front bumper allowing rotation of the grill relative to the front bumper about the pivot axis when the front bumper is deformed during a front impact event.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

The invention relates to an attachment of a front radiator grill to a front bumper of an automotive vehicle. The attachment allows the front grill to rotate relative to the front bumper during an impact between an object and the front bumper, so as to minimize damage to the front grill and costs associated with the repair of the vehicle due to the impact.

Figure 1:
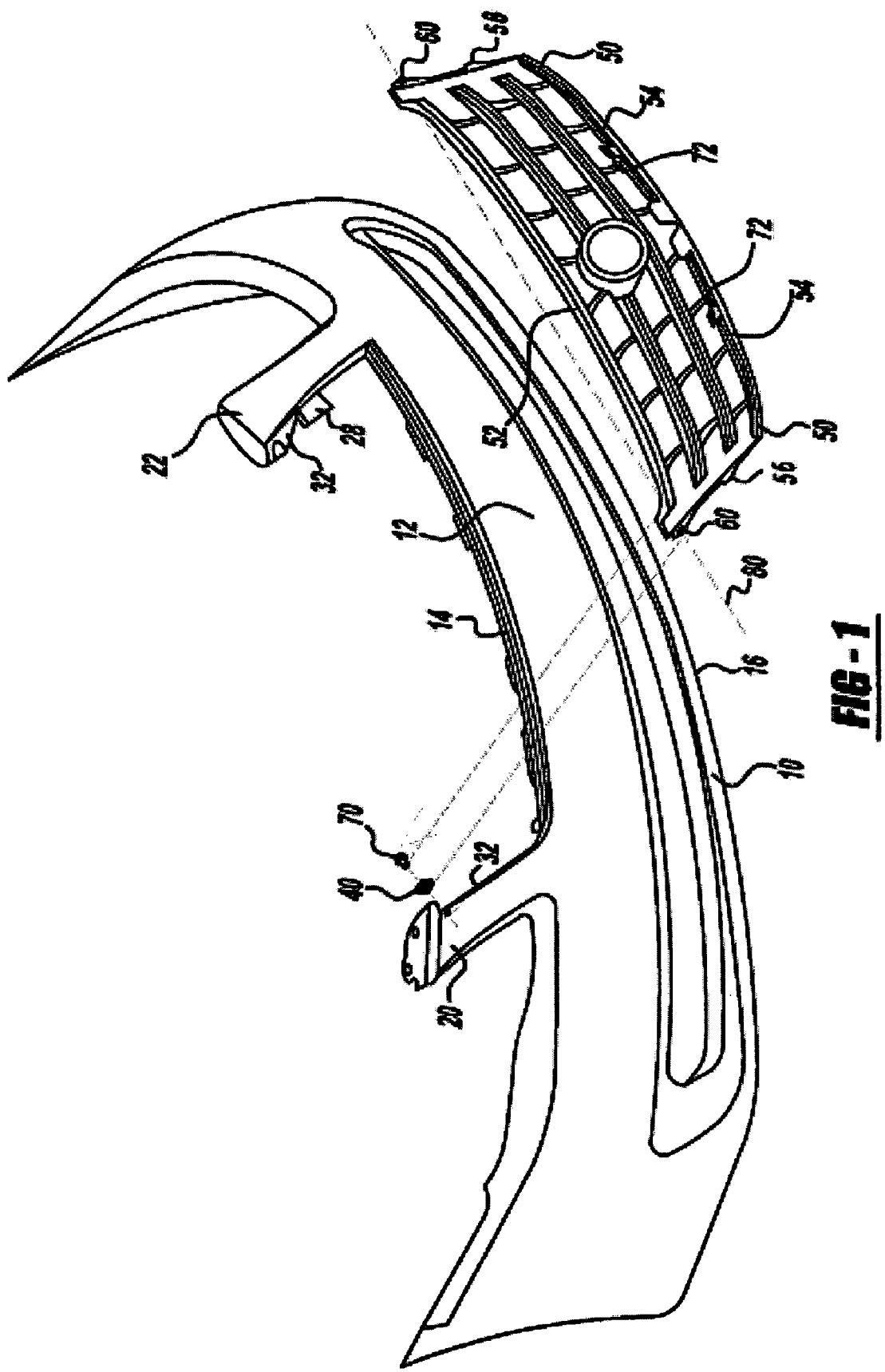
FIG. 1 is an exploded front perspective view of a grill and bumper assembly according to one embodiment of the invention.
Figure 2:
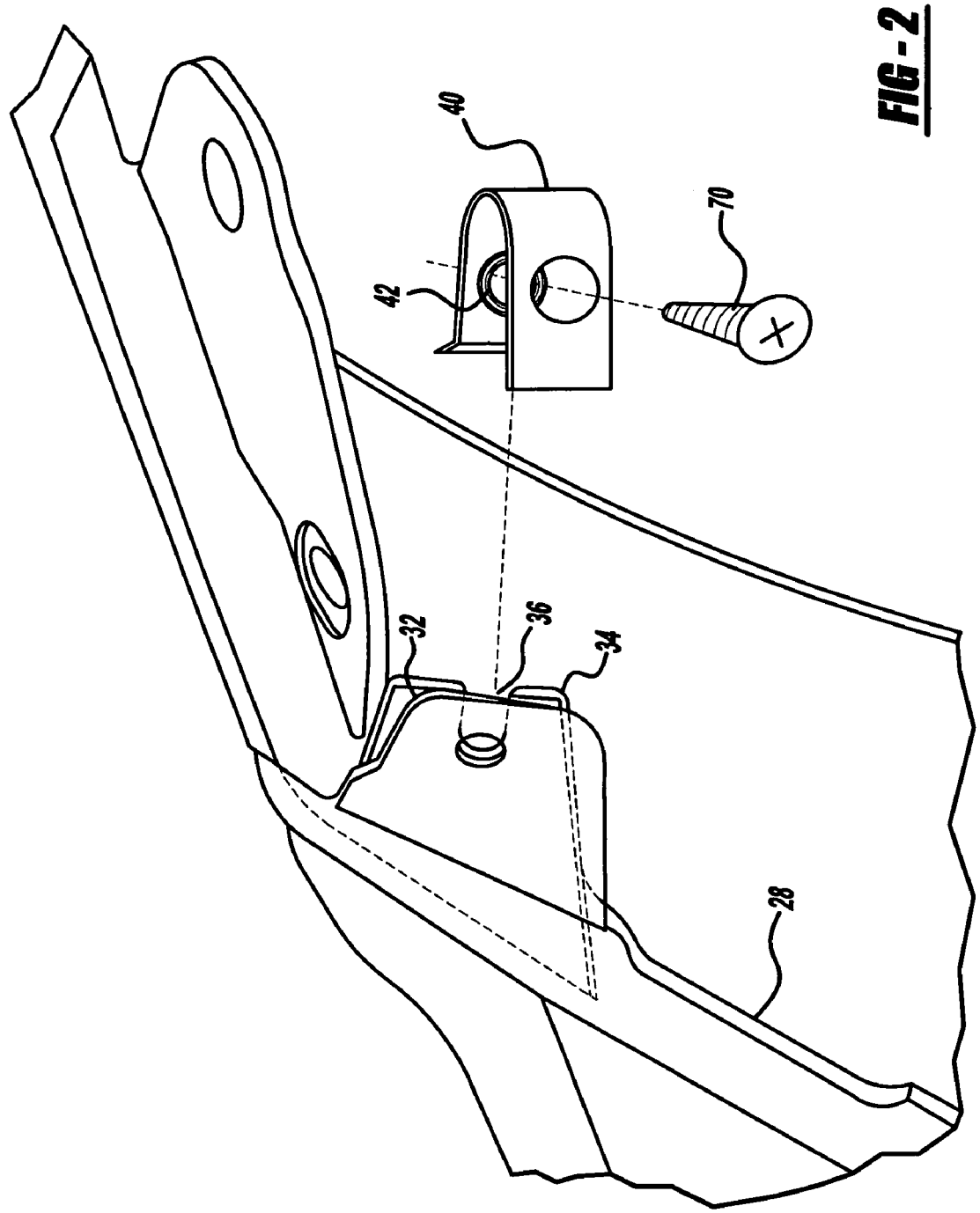
FIG. 2 is an enlarged rear perspective view of the grill and bumper assembly.

Referring to FIGS. 1 and 2, a vehicle bumper 10 is adapted to be fixedly secured to a front end of an automotive vehicle. The bumper 10 includes a generally horizontal beam section 12 that extends transversely along the front end of the vehicle. The beam section 12 includes opposite top 14 and bottom 16 edges. A pair of pillars 20, 22 extends upwardly from the top edge 14 of the bumper 10. The pillars 20, 22 are spaced apart from the ends of the beam section 12 to define spaces for receiving headlamp housings. The pillars 20, 22 are also spaced apart to receive a front grill 50 therebetween.

Each pillar 20, 22 includes a front face extending between spaced apart inner 32 and outer side walls. Each inner wall 32 includes a rear edge 34. A slot 36 extends from the rear edge 34 of the inner wall 32. The slot 36 is positioned adjacent the upper end of the pillar 20, 22. A conventional spring-clip nut 40 is secured to the inner wall 32. The nut 40 includes a threaded bore 42 aligned with the slot 36.

The grill 50 is generally rectangular shaped as viewed from the front of the vehicle. The grill 50 includes opposite top 52 and bottom 54 ends extending between opposite and spaced apart sides 56, 58. A hole 60 is formed in each side of the grill 50. The holes 60 in the grill 50 are substantially axially aligned with the slots 36 in the pillars 20, 22, when the grill 50 is seated in the space between the pillars 20, 22.

The grill 50 is assembled to the bumper 10 by first positioning the grill 50 between the pillars 20, 22. Flanges 28 extend outwardly from the pillars 20, 22 to engage corresponding slots in the grill 50 to facilitate location of the grill 50 relative to the bumper 10. Threaded fasteners 70 are inserted through the holes 60 in the grill 50 and the slots 36 along the rear edge 34 of the bumper 10. The fasteners 70 are threadingly engaged with the nuts 40 and tightened to secure the grill 50 to the bumper 10. Tabs 72 extend outwardly from the bottom end 54 to secure the grill 50 to along the top edge 14 of the beam section 12. Optionally, push or barb-type fasteners are inserted through corresponding holes formed in the bumper 10 and grill 50.

During the IIHS flat barrier front impact test, or other similar low-speed impact event, the front bumper 10 is compressed, deformed and displaced rearwardly and downwardly relative to the front end of the vehicle chassis. The grill 50 is displaced along with the bumper 10, until the tabs 72 disengage from the top edge 14 of the beam section 12. The grill 50 and bumper 10, however, remain attached by the threaded fasteners 70 and are freely pivotable relative to each other about a pivot axis 80 defined through the holes 60 in the grill 50. As has been shown in repeated testing, pivotal movement of the grill 50 relative to the bumper 10 during the impact event minimizes structural damage to the grill 50. Thus, the grill 50 is generally re-usable, notwithstanding any minor cosmetic damage due to abrasions. Re-use of the grill 50 during a repair of the vehicle significantly reduces the repair costs.

The invention has been described in an illustrative manner. It is, therefore, to be understood that the terminology used is intended to be in the nature of words of description rather than of limitation. Many modifications and variations of the invention are possible in light of the above teachings. For example, the bumper 10 and grill 50 are typically formed from a glass-reinforced plastic in an injection molding process, but can be produced from any suitable materials and by any suitable methods known by those having ordinary skill in the art. Further, any conventional fastener 70 can be used for coupling the grill 50 to the bumper 10, as long as it allows pivotal movement of the grill 50 relative to the bumper 10 about the pivot axis 80 during a frontal impact event. Thus, within the scope of the appended claims, the invention may be practiced other than as specifically described herein.

The invention claimed is:

1. An automotive vehicle comprising:
   a front bumper extending along a front end of the vehicle; and
   a grill pivotally coupled to the front bumper for rotation about a substantially horizontal pivot axis relative to the front bumper, the grill having a bottom end releasably coupled to the front bumper allowing rotation of the grill relative to the front bumper about the pivot axis when the front bumper is deformed during a front impact event.

2. The vehicle as set forth in claim 1, wherein the grill includes at least one outwardly extending tab for locating the bottom end of the grill relative to a top edge of the front bumper, the tab having an edge that is hookingly engaged with the top edge of the bumper, the edge of the tab being adapted to release the top edge of the bumper when the front bumper is deformed during the front impact event.

3. The vehicle as set forth in claim 2, wherein the front bumper includes a pillar having an inner wall adjacent to the grill, the inner wall having a slot extending forwardly from a rear edge thereof.

4. The vehicle as set forth in claim 3, wherein the grill includes a hole aligned with the slot in the pillar for receiving a longitudinally extending fastener therethrough and defining the pivot axis of the grill.

5. The vehicle as set forth in claim 4 including a nut for threadingly engaging the fastener to retain the grill to the pillar, while allowing rotation of the grill relative to the front bumper about the pivot axis when the front bumper is deformed during the front impact event.

6. The vehicle as set forth in claim 1, wherein the front bumper includes a pair of pillars, the pillars being generally parallel and spaced apart for receiving the grill therebetween.

7. The vehicle as set forth in claim 6, wherein the grill is pivotally coupled to an upper end of each pillar for rotation about the pivot axis relative to the front bumper.

8. The vehicle as set forth in claim 7, wherein the grill includes at least one outwardly extending tab for locating the bottom end of the grill relative to a top edge of the front bumper, the tab having an edge that is hookingly engaged with the top edge of the bumper, the edge of the tab being adapted to release the top edge of the bumper when the front bumper is deformed during the front impact event.

* * * * *